INVENTOR.
DAVID ATLAS

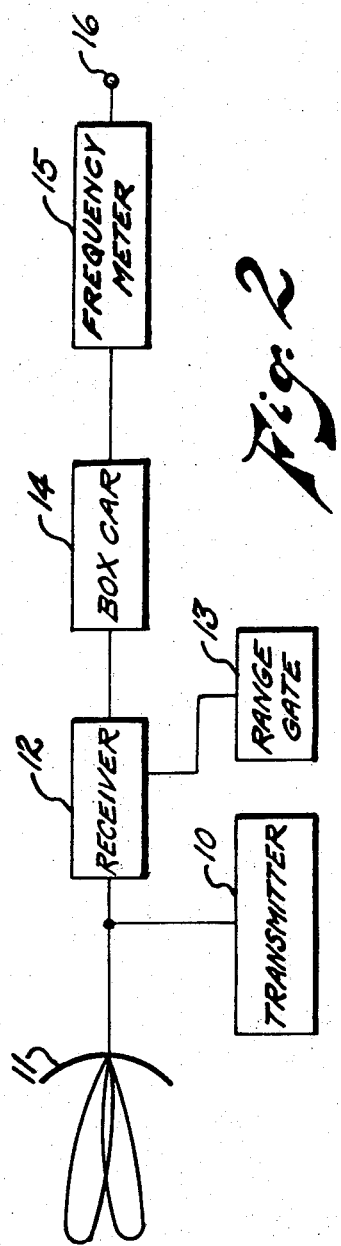
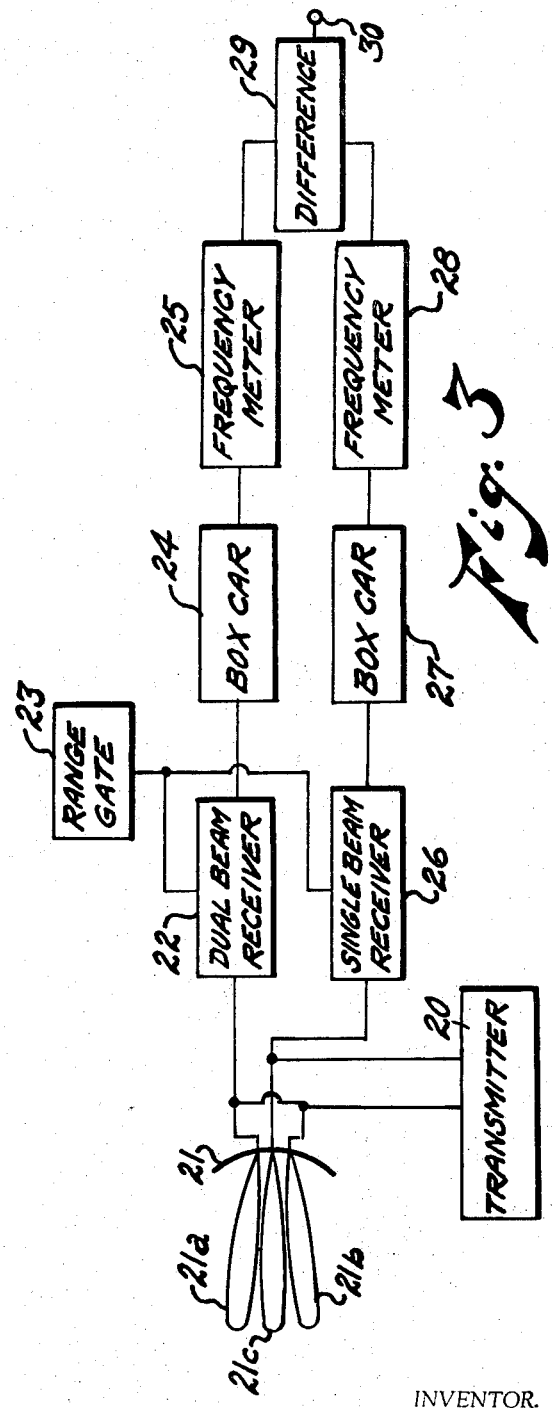

United States Patent Office 3,373,428
Patented Mar. 12, 1968

3,373,428
METHOD AND SYSTEM FOR RADAR
VELOCITY MEASUREMENTS
David Atlas, Newton, Mass.
(828 Chestnut St., Waban, Mass. 02168)
Filed July 28, 1965, Ser. No. 475,612
12 Claims. (Cl. 343—8)

ABSTRACT OF THE DISCLOSURE

A method and system for measurement of wind velocity by transmitting two radar beams simultaneously toward distributed targets (e.g. precipitation, ground) in such a manner that the echoes in one beam produce a small positive Doppler shift, and those in the other an equal negative shift. The returning echoes beat with one another to produce a fluctuating return whose variance is proportional to the sum of the intrinsic variance of the targets within a single beam plus the cross-beam velocity of the targets. The single beam variance is then subtracted out either by measuring on one beam alone or using a third beam. The remainder is directly proportional to target velocity.

---

The invention described herein may be manufactured and used by or for the United States Government for governmental purposes without payment to me of any royalty thereon.

This invention relates to radar and more particularly to a radar method and system for velocity measurements.

In my pending patent application, "Method and System for Wind Measurements," filed Feb. 18, 1965, bearing Ser. No. 433,820 I described a method of measuring the wind velocities of distributed targets such as clouds and precipitation by a simple modification to a conventional (non-Doppler) radar. The method involved replacing the single beam of the radar by a dual beam, each beam squinted slightly to either side of the antenna bore-sight axis, which is directed perpendicular to the target velocity vector. If the beams were infinitely thin, the targets in one would produce a slight positive Doppler frequency shift while those in the other would produce an equal and opposite negative shift. Since the echoes in both beams arrive at the receiver simultaneously, they beat with one another to produce an echo which fluctuates with a frequency equal to twice the Doppler shift in each beam, and so the fluctuation frequency is a measure of the target velocity component transverse to the antenna bore-sight axis.

Unfortunately, however, real beams are not infinitely thin and so the Doppler spectrum produced by a dual beam pattern is a double peaked curve with trailing wings on the far sides as indicated in FIGURE 1a. Similarly, the echoes on conventional radar do not fluctuate with a single frequency but with a spectrum of frequencies. The fluctuation spectrum corresponding to the dual beam pattern is then as shown in FIGURE 1b with a primary peak at zero frequency and a secondary peak at the frequency corresponding to the case of the infinitely thin beams. In the previous invention it was therefore necessary to measure the entire fluctuation spectrum and identify the position of the secondary peak as a measure of the transverse wind speed. However, in the presence of wind shear and turbulence within the beams, the net effect is to broaden the Doppler spectrum of each beam, and in many cases, this would wash out the minimum in the dual beam Doppler spectrum and the corresponding minimum in the fluctuation spectrum so that the position of the peaks are no longer identifiable (see curve for $2v_0 = 3\sigma$ in FIGURE 1b). This would make it impossible to measure the wind speed. Furthermore, the previous method required a measurement of the complete fluctuation spectrum which requires elaborate instrumentation, and is cumbersome and time consuming.

I have found, however, that all the required information for a velocity measurement is available through a simple measurement of the variance of the fluctuation spectrum. It is also noted that both the previous invention and the present one can be used in any conventional airborne radar system for the purposes of measuring the speed and direction of flight. In this respect, it has the very great advantage of providing any airborne radar with a capability as a Doppler navigator.

The principle of the system is essentially as follows. The frequency (or velocity) variance of the fluctuation spectrum of a single beam viewing distributed target (throughout the beam), either ground targets, precipitation, chaff, etc., can be specified as $2\sigma^2$, where $\sigma^2$ is the variance of the corresponding Doppler spectrum. This variance includes all the factors which contribute to the breadth of the Doppler spectrum; e.g. the cross-beam motion of the scatterers in a finite beam, antenna scanning velocities, turbulence, wind shear, and particle fall velocities. When using a dual beam pattern in which each beam has the same width as in the single beam case it can be shown mathematically that the variance is increased and can be expressed by $$s^2 = 2\sigma^2 + 2\delta^2 W^2$$

where $W$ is the mean velocity of the targets perpendicular to the axis of the dual beam pattern, and $\delta$ is half the beam spacing. The equation holds for small beam spacings. Clearly then, the difference $s^2 - 2\sigma^2$ is a measure of the transverse target velocity $W$. The idea then is simply to measure the variance of the fluctuation spectrum with a single beam, do the same for the dual beam pattern, and take the difference between the two. The result is essentially independent of antenna beam width and of all contaminating factors affecting the width of either the Doppler or fluctuation spectra and is accurate as long as the difference in variances exceeds the variance noise. The only assumption involved is that the velocity variance of the targets in both beams is identical.

In accordance with the present invention and a primary object thereof is to provide two radar beams which are transmitted simultaneously from the same transmitter toward distributed targets (e.g. precipitation, ground) in such a manner that the echoes in one beam produce a small positive Doppler shift, and those in the other an equal negative shift. The returning echoes beat with one another to produce a fluctuating return whose variance is proportional to the sum of the intrinsic variance of the targets within a single beam plus the cross-beam velocity of the targets. The single beam variance is then subtracted out either by measuring on one beam alone or using a third beam. The remainder is directly proportional to target velocity independent of beam width or Doppler contamination.

The aforementioned pending patent application described the basic technique using two beams. That method required that the entire fluctuation spectrum be measured to determine velocity. The new technique requires only that the variance of the spectrum be measured, which can be done cheaply. The method of subtracting out the intrinsic variance of the target echoes in a single beam is also novel. The present invention permits any standard radar to be adapted for velocity measurements using distributed targets. In the case of clouds, precipitation, or ionized clouds, it permits measurements of winds. In the case of ground targets, it permits any airborne radar to be modified cheaply for Doppler velocity measurements, e.g. to replace expensive Doppler navigators. It is to be noted that some of the uses include hurricane wind velocity measurements from ground and airborne radars; measurement of ionospheric winds; and measurement of aircraft speed and direction using any airborne radar.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described two embodiments of the invention.

FIGURE 2 illustrates one embodiment of the present invention, and

FIGURE 3 shows a second embodiment of the present invention.

Figure 1A:
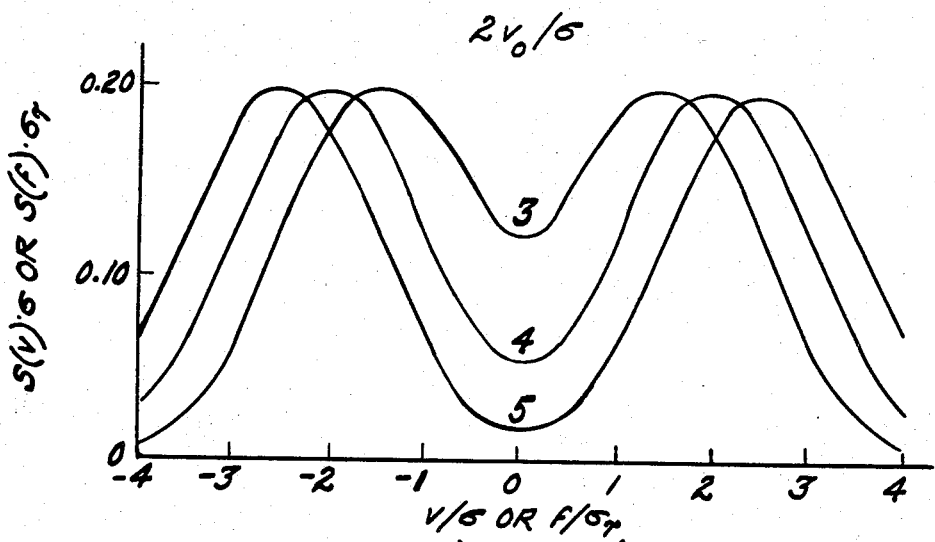
FIGURE 1a shows the radar Doppler spectrum produced by a dual beam pattern.

FIG. 1a represents a variety of Doppler spectra which would be observed by a dual beam radar with various angular spacings 2 between the axes of the two beams when uniformly distributed targets are moving perpendicular to the bisector between the two beams. This is to say that the curves may be regarded as the two-way radiation pattern of the dual beam antenna as a function of angle $\theta$ from the bisector between the beam axes. In this instance the abscissa of FIG. 1a would represent angle $\theta$. But for targets moving perpendicular to said bisector, the targets which are crossing the angularly offset portion of the beam have a radial velocity component $v = W \sin \theta \approx W\theta$ where W is the cross-bisector velocity of the targets and $\theta$ the angle at which they appear in the beam. Accordingly, each target element will produce an echo proportional to the two-way radiation pattern intensity with a Doppler shift proportional to $\theta$, the offset angle from the bisector. Thus, each dual beam pattern produces a corresponding Doppler spectrum as shown in FIG. 1a, where the velocity abscissa now corresponds to Doppler frequency by the Doppler equation $$F = 2v/\lambda = 2W\theta/\lambda$$

and standard deviation $\sigma_F = 2\sigma_v/\lambda$, where $\sigma_v$ is the standard deviation of the Doppler velocity spectrum corresponding to a single beam.

Note: In FIG. 1a, the three curves labeled $2v_\sigma/\epsilon_\sigma = 3$, 4, and 5 which correspond to beam spacing $2 = 1.8\theta_o$, $2.4\theta_o$, and $3\theta_o$. The peaks in the Doppler velocity spectra occur at $v_\sigma \approx \pm W\delta$ where the axes of the two beams occur and W is the speed of the targets perpendicular to the two beam bisector.

But a Doppler spectrum cannot be measured by a non-coherent radar. Instead, the various Doppler frequencies beat with one another upon arrival (simultaneously) at the receiver to provide fluctuating signal intensities. A spectral analysis of the signal intensity fluctuation would procedure the three fluctuation spectra shown in FIG. 1b, which correspond to the three non-measureable Doppler spectra in FIG. 1a. Note that the curve marked $2v_0 = 4\sigma$ (or $\delta = 1.2\theta_\sigma$) has a secondary peak at a normalized fluctuation frequency $F/\sigma_f \approx 4$. This is the beat frequency between the two peaks in the corresponding Doppler spectrum of FIG. 1a at $F/\sigma_f = +2$ and $F/\sigma_f = -2$. In short, each non-measurable Doppler spectrum produces a corresponding measureable fluctuation spectrum as represented by the curves in FIG. 1b.

In the aforementioned invention application No. 433,820, there was used either a fluctuation analyzer or a frequency analyzer to perform a complete spectrum analysis of the fluctuating signals in order to locate the secondary peaks in the fluctuation spectrum which occur at frequencies $F \approx 4W\delta/\lambda$ where $2\delta$ is the angular spacing between the axis of the two beams, $\lambda$ is the wavelength and W is the target velocity perpendicular to the two beam bisector. However, further analysis shows that the means square fluctuation frequency $\overline{F^2} = 4s^2/\lambda^2$ where $$s^2 = 2\sigma^2 + 2\delta^2 W^2$$

Here $\sigma^2$ is the variance of the velocity spectrum corresponding to the non-measurable Doppler spectrum for a single beam and $2\sigma^2$ is the corresponding variance of the spectrum of relative velocities. Accordingly the root mean square frequency which would be measured by a frequency meter such as 15 in FIG. 2 would be $$(\overline{F_1^2})^{1/2} = 2\sqrt{2}\sigma/\lambda$$

where the subscript 1 on F signifies a single beam. When the second beam is used simultaneously, the RMS fluctuation frequency is increased by the amount $2\sqrt{2}\delta W/\lambda$. Thus $$(\overline{F_2^2})^{1/2} = \frac{2\sqrt{2}}{\lambda}(\sigma + \delta W)$$

where the subscript 2 signifies the dual beam measurement. The difference $$\overline{(F_2^2)^{1/2}} - \overline{(F_1^2)^{1/2}} = \frac{2\sqrt{2}}{\lambda}\delta W$$

Since both the wavelength $\lambda$ and the beam-spacing $2\delta$ are known, the difference in RMS fluctuation frequencies between the dual beam pattern and the single beam pattern is a direct measure of W, the target velocity perpendicular to the dual beam bisector.

Figure 1B:
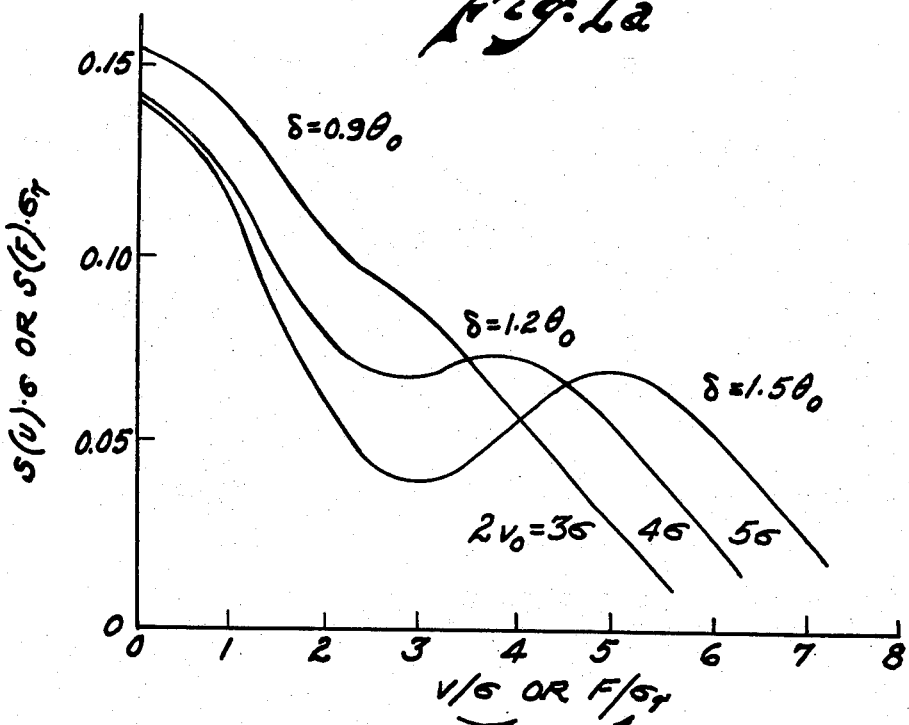
FIGURE 1b shows the fluctuation spectrum corresponding to the dual beam pattern.

Both FIGS. 1a and 1b relate to the dual beam pattern. FIG. 1a represents the Doppler velocity spectra (or Doppler frequency spectra since Doppler frequency $= (2/\lambda) \times$ Velocity). These spectra are unmeasurable except with a Doppler radar. However, FIG. 1b represents the corresponding spectra of signal intensity fluctuations which would be measured by an ordinary non-coherent (i.e., non-Doppler) radar.

Now referring to FIGURE 2, there is shown conventional radar transmitter 10 which is used to feed antenna 11 which in turn radiates a dual beam pattern. It is noted that the transmit, anti-transmit radar function is omitted for purposes of brevity although present system of necessity includes the conventional radar use thereof. The echoes from the same range are mixed in the R.F. system which is included with receiver 12 which is range gated by gate 13. The detected echoes from the particular range under examination are box-carred in box car 14 to hold the amplitude of each echo for the duration of the interpulse period, and the output is capacity coupled to frequency meter 15. Frequency meter 15 also has output terminal 16. The frequency meter thus measures the rate at which the signal crosses its average level and is thus a direct measure of the variance of the fluctuation spectrum. In the configuration of FIGURE 2, the variance is measured once with the dual beam pattern and once with a single beam simply by shorting out one beam by any conventional means. In order to determine the direction of the target velocity vector, the antenna is scanned until the dual beam variance is maximized. In case of precipitation or chaff, this occurs when the wind is perpendicular to the antenna bore-sight axis. In the case of ground targets, it occurs when the radar-baring vehicle is moving perpendicular to the antenna bore-sight axis. Thus the system can be used both for the measurement of winds using precipitation or chaff as a tracer, or the velocity and direction of a vehicle using ground targets.

Frequency meter 15 is any conventional frequency measuring device. The input to meter 15 is a time varying voltage which varies with the intensity of the echo power returned from a particular range from pulse to pulse. Box car 14 holds the voltage or intensity level at a value corresponding to the echo intensity in each pulse for the entire interpulse period. If the echo intensity pulses varied sinusoidally with time from one pulse to the next, etc., the box car signal would be a square wave approximation to the sinusoid. Thus there would be a single approximately sinusoidal voltage introduced into the frequency meter and its output would be the frequency of the sinusoid. In actual fact, the echo pulses fluctuate in an irregular manner and so the box car output is an irregular voltage. In this instance, the frequency meter output (a voltage for meter display or a numerical display from a digital frequency meter) represents the root mean square frequency of the echo intensity fluctuations. With a single beam the output would read $(\overline{F_1^2})^{1/2}$ as described above; with two beams, the output would read $(\overline{F_2^2})^{1/2}$. The difference is directly proportional to W as previously described.

FIGURE 3 is a second embodiment of the invention in which the variance of the dual beam pattern is measured by the dual beam channel comprising conventional transmitter 20 feeding antenna 21 which radiates dual beam 21a and 21b. The echoes from the same range are mixed in the R.F. system feeding conventional dual beam receiver 22 which is range gated by gate 23. The detected echoes from the particular range under examination are box-carred in box car 24 to hold the amplitude of each echo for the duration of the inter-pulse period. The output is coupled to frequency meter 25 which measures the dual beam variance. The single beam variance on an identical axial beam is measured simultaneously by means of a second identical channel but of a single beam being comprised of transmitter 20 feeding antenna 21 which radiates single beam 21c. The return echoes therefrom pass through single beam receiver 26 which is range gated by gate 23, box car 27, and frequency meter 28. The difference in the variances may then be recorded continuously by output 30 of difference circuit 29 which provides a direct measure of the transverse target velocity.

In FIG. 3, frequency meters 25 and 28 perform exactly as does frequency meter 15 in FIG. 2. The only difference here is that 28 measures $(\overline{F_1^2})^{1/2}$ at the same time that 25 measures $(\overline{F_2^2})^{1/2}$ so that their difference may be measured immediately by block 29. It is to be noted that the frequency meters are conventional and may be such as shown and described in Encyclopedia of Science and Technology by McGraw-Hill, pages 501–511.

The system of my invention can be expanded to permit simultaneous measurements in a multiplicity of range elements by adding range gates and box car, frequency meter combinations at each additional range gate. Alternatively, the fluctuating signals at all range gates can be stored electronically or magnetically and processed rapidly by one of a variety of processing schemes to read the variance essentially simultaneously at all ranges.

What I claim is:

1. A method for radar velocity measurements of targets comprising determining the variance of the fluctuation spectrum of radar return echoes resulting from directing a predetermined dual radar beam towards distributed targets, determining the variance of the fluctuation spectrum of radar return echoes resulting from directing a single predetermined radar beam towards said target, and determining the difference between said two variances to obtain said velocity of said targets.

2. A method of determining the velocity of targets by radar comprising measuring the frequency variation of the fluctuation spectrum of radar return echoes resulting from directing a predetermined dual radar beam towards distributed targets such as precipitation and ground, measuring the frequency variation of radar return echoes resulting from directing a predetermined single radar beam towards said targets, and measuring the difference between said variations to obtain said velocity of said targets.

3. A method for measuring transverse target velocity by radar comprising directing a predetermined dual radar beam towards distributed targets, receiving return echoes resulting from, said dual beam intercepting said targets, measuring the variance of the fluctuation spectrum of said received echoes, directing a predetermined single radar beam towards said targets, receiving return echoes resulting from said single beam intercepting said targets, measuring the variance of the fluctuation spectrum of said single beam return echoes, and measuring the difference between said variances to obtain said transverse target velocity.

4. A method of measuring transverse target velocity by radar comprising simultaneously directing a predetermined dual and single radar beam towards distributed targets, measuring separately the variation of the fluctuation spectrum of the return signals resulting from said dual and single beam, respectively, and measuring the difference between said two variances to obtain said transverse target velocity.

5. A method of measuring target velocity by radar comprising alternately directing a predetermined dual and single radar beam towards distributed targets, alternately measuring the variation of the fluctuation spectrum of the return signals resulting from said dual and single radar beam, and determining the difference between said two variances to obtain said transverse target velocity.

6. A method of determining target velocity and target velocity vector by radar comprising directing a predetermined dual radar beam towards distributed targets, measuring the variance in the fluctuation spectrum of the return signals resulting from said dual beam, scanning said dual radar beam to maximize said variation to obtain said vector, also directing a predetermined single beam towards said targets, measuring the variance of the fluctuation spectrum of the return signals resulting from said single radar beam, and measuring the difference between said two variances to obtain said target velocity.

7. A system for measuring target velocity by radar comprising means to simultaneously direct a predetermined dual and single radar beam towards distributed targets, separate means to measure the variance in the fluctuation spectrum of the return signals resulting from said dual and single beam, respectively, and common means to measure the difference between said two variances to obtain said target velocity.

8. A system for measuring target velocity by radar comprising means to alternately direct a predetermined dual and single radar beam towards distributed targets, means to alternately measure the variance of the fluctuation spectrum of the return signals resulting first from said dual beam and then from said single beam, and means to measure the difference between said two variances to obtain said target velocity.

9. A system for measuring target velocity and the direction of the target velocity vector comprising means to direct a predetermined dual radar beam towards distributed targets, means to measure the variance in the fluctuation spectrum of the return signals resulting from said dual beam, said directing means being scanned to maximize said variation to obtain said direction of said target velocity vector, means to direct a predetermined single radar beam towards said distributed targets, means to measure the variance in the fluctuation spectrum of the return signals resulting from said single beam, and means to measure the difference in said two variations to obtain said target velocity.

10. A radar velocity measurement system comprising means to radiate two radar beams simultaneously towards distributed targets such as precipitation and ground in such manner that echoes from one of said beams produce a small positive Doppler shift, and those in said other an equal negative shift, said radiating means having a common transmitter, means to receive returning echoes therefrom, said receiving means including a common mixer, a box car circuit receiving the output of said receiver means, frequency meter means receiving the output from said box car circuit, said meter means providing first output proportional to the variation in the fluctuation spectrum of said returning echoes, means to radiate a single radar beam towards said distributed targets, means to receive return echoes therefrom, a box car circuit receiving the output from said receiver means, a frequency meter receiving the output of said box car circuit, said meter providing a second output proportional to the variation of the fluctuation spectrum of said return echoes from said single beam, means to measure the difference between said first and second outputs, said difference being a measure of said velocity of said targets.

11. A system for measuring wind velocity by directing radar energy to targets such as precipitation and chaff comprising means for directing predetermined dual and single radar beams towards said targets, said directing means being common to both said dual and single beams, means for measuring the frequency variations of the fluctuation spectrum for each of the return echoes resulting from said dual and single beams, and means to measure the difference between said two variations to provide said wind velocity.

12. A system for measuring wind velocity and direction by directing radar energy towards targets such as precipitation and chaff comprising means for directing predetermined dual and single radar beams towards said targets, said directing means being common to both said dual and single beams, means for measuring the frequency variations of the fluctuation spectrum for each of the return echoes resulting from said dual and single beams, said measurement of said frequency variations for said return echoes of said dual beams being maximized by scanning said directing means to obtain said wind direction, and means to measure the difference between said two variations to obtain said wind velocity.

References Cited

UNITED STATES PATENTS 3,107,351   10/1963   Milam.

RODNEY D. BENNETT, *Primary Examiner.*

C. L. WHITHAM, *Assistant Examiner.*